Figure 1:
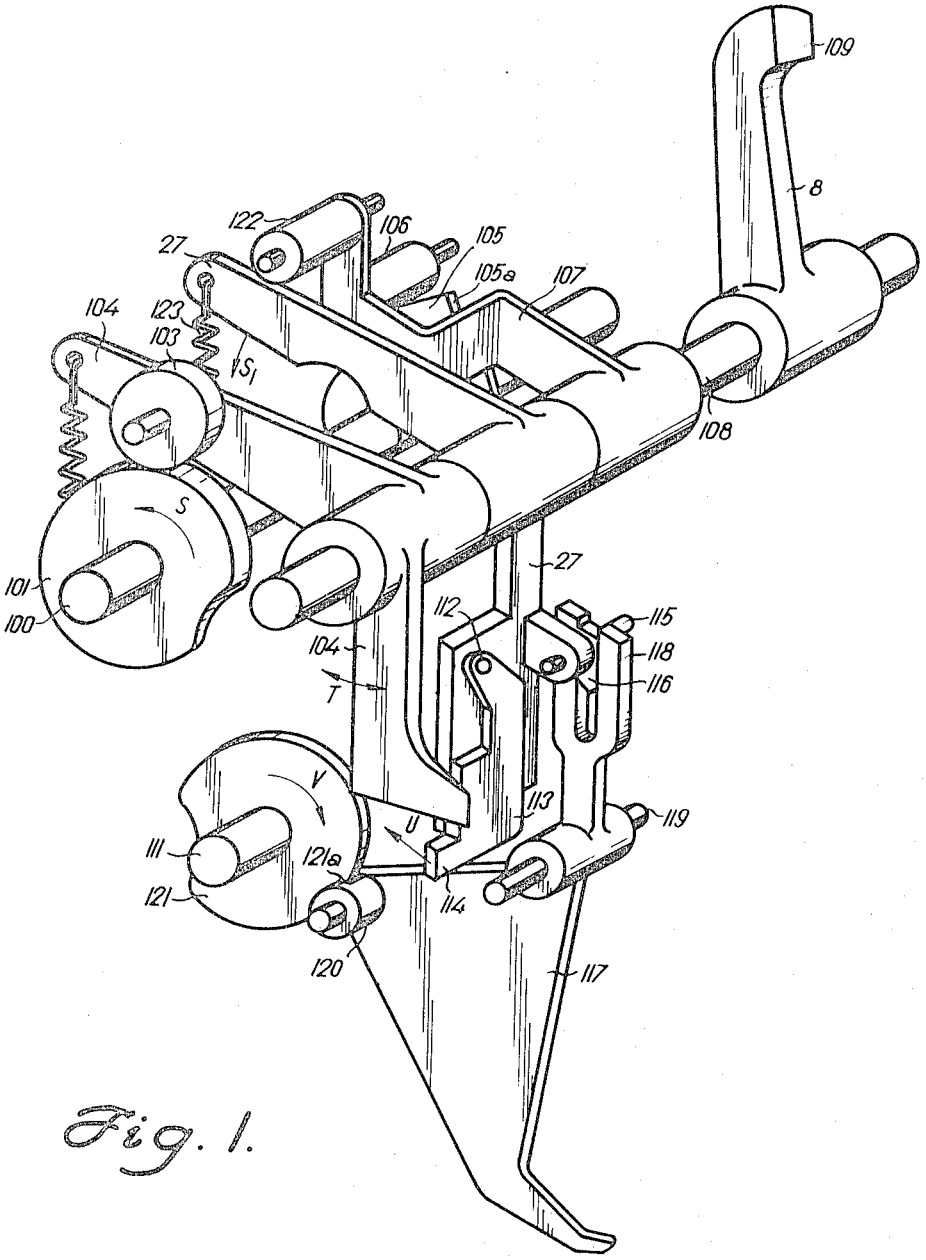
Figure 2:
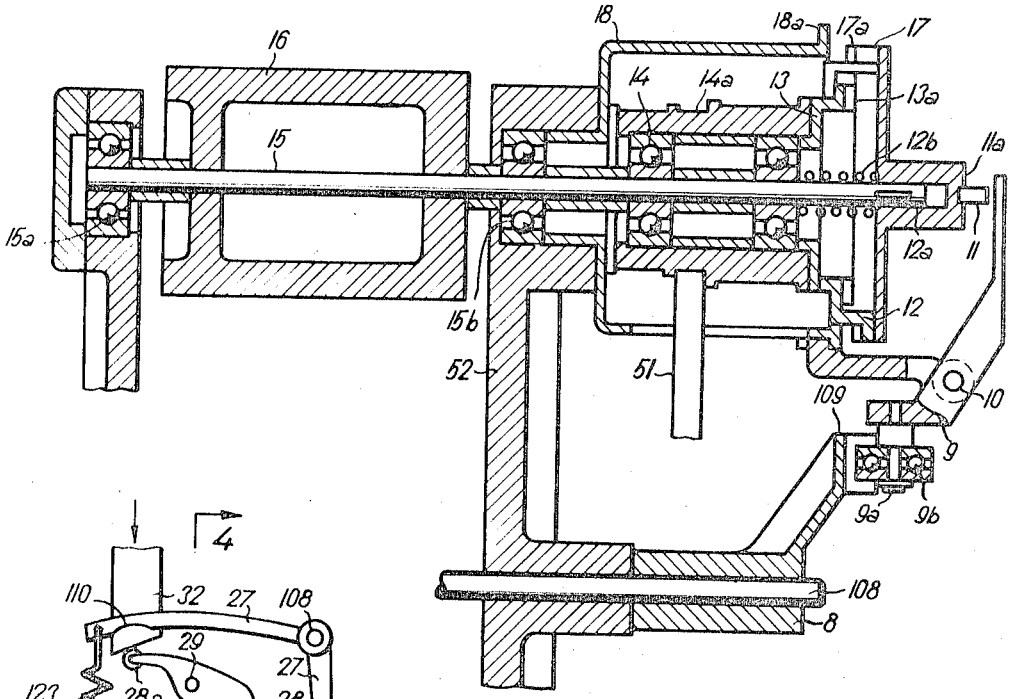
Figure 3:
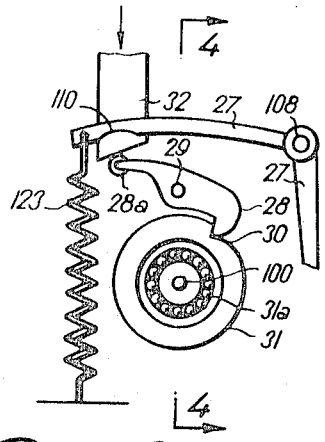
Figure 4:
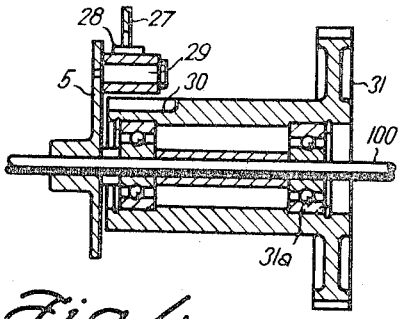

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 403

T893,008

DEVICE FOR CONTROLLING THE OPERATION OF A WINDING UNIT IN AUTOMATIC WINDING MACHINES

Vladimir Prasil, Brno, Czechoslovakia, assignor to Elitex, Zavody textilniho strojirenstvi generalni reditelstvi, Liberec, Czechoslovakia

Filed Jan. 8, 1971, Ser. No. 104,927
Int. Cl. B65h *54/22, 63/02*
U.S. Cl. 242—35.6 R
2 Sheets Drawing. 4 Pages Specification

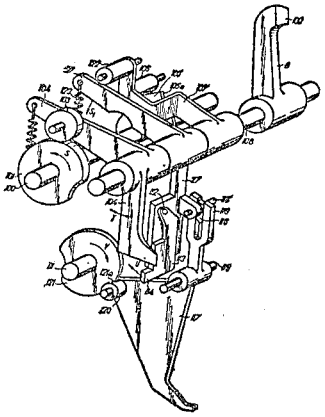

Device for controlling the operation of a winding unit in automatic winding machines, said winding unit having a clutch and a brake. The device controls the operation of both the clutch and the brake of the winding unit during winding, as well as during the automatic removal of yarn breakage, during knotting of the yarn end from a new supply cop, and upon eliminating pattern winding on the wound bobbin. The device has a series of cams and levers; a first lever forms on one hand a component of mechanism for disengaging the winding unit from the drive, and on the other hand a component of mechanism for controlling the clutch and the brake of the winding unit upon automatic removal of yarn breakage or upon knotting the yarn end of a new supply cop, said first lever constituting at the same time the main control element for engaging and disengaging a single-revolution clutch through which the bobbin driving distributor of the winding unit is driven.

Dec. 14, 1971 V. PRASIL T893,008

DEVICE FOR CONTROLLING THE OPERATION OF A WINDING UNIT IN AUTOMATIC WINDING MACHINES

Filed Jan. 8, 1971 2 Sheets-Sheet 1

INVENTOR:

BY: Vladimir PRASIL

Arthur O. Klein

ATTORNEY

Dec. 14, 1971 V. PRASIL T893,008

DEVICE FOR CONTROLLING THE OPERATION OF A WINDING UNIT IN AUTOMATIC WINDING MACHINES

Filed Jan. 8, 1971 2 Sheets-Sheet 2

INVENTOR:

BY: Vladimir PRASIL

Arthur O. Klein

ATTORNEY